March 13, 1928.  1,662,428

C. E. LOWE

MACHINE FOR MAKING MANDRELS

Filed July 31, 1924   4 Sheets-Sheet 1

March 13, 1928. 1,662,428
C. E. LOWE
MACHINE FOR MAKING MANDRELS
Filed July 31, 1924 4 Sheets-Sheet 3

Clyde E. Lowe
Inventor
by Smith & Freeman
Attorneys

March 13, 1928.

C. E. LOWE 1,662,428

MACHINE FOR MAKING MANDRELS

Filed July 31, 1924    4 Sheets-Sheet 4

Clyde E. Lowe
Inventor
by Smith & Freeman
Attorneys

Patented Mar. 13, 1928.

1,662,428

UNITED STATES PATENT OFFICE.

CLYDE E. LOWE, OF EAST CLEVELAND, OHIO.

MACHINE FOR MAKING MANDRELS.

Application filed July 31, 1924. Serial No. 729,242.

This invention relates to mandrels for use in the manufacture of pneumatic tire tubes and has for its objects the provision of a new and improved machine and new and improved dies for producing such mandrels; while further objects and advantages of the invention will become apparent as the description proceeds.

Figure 1:
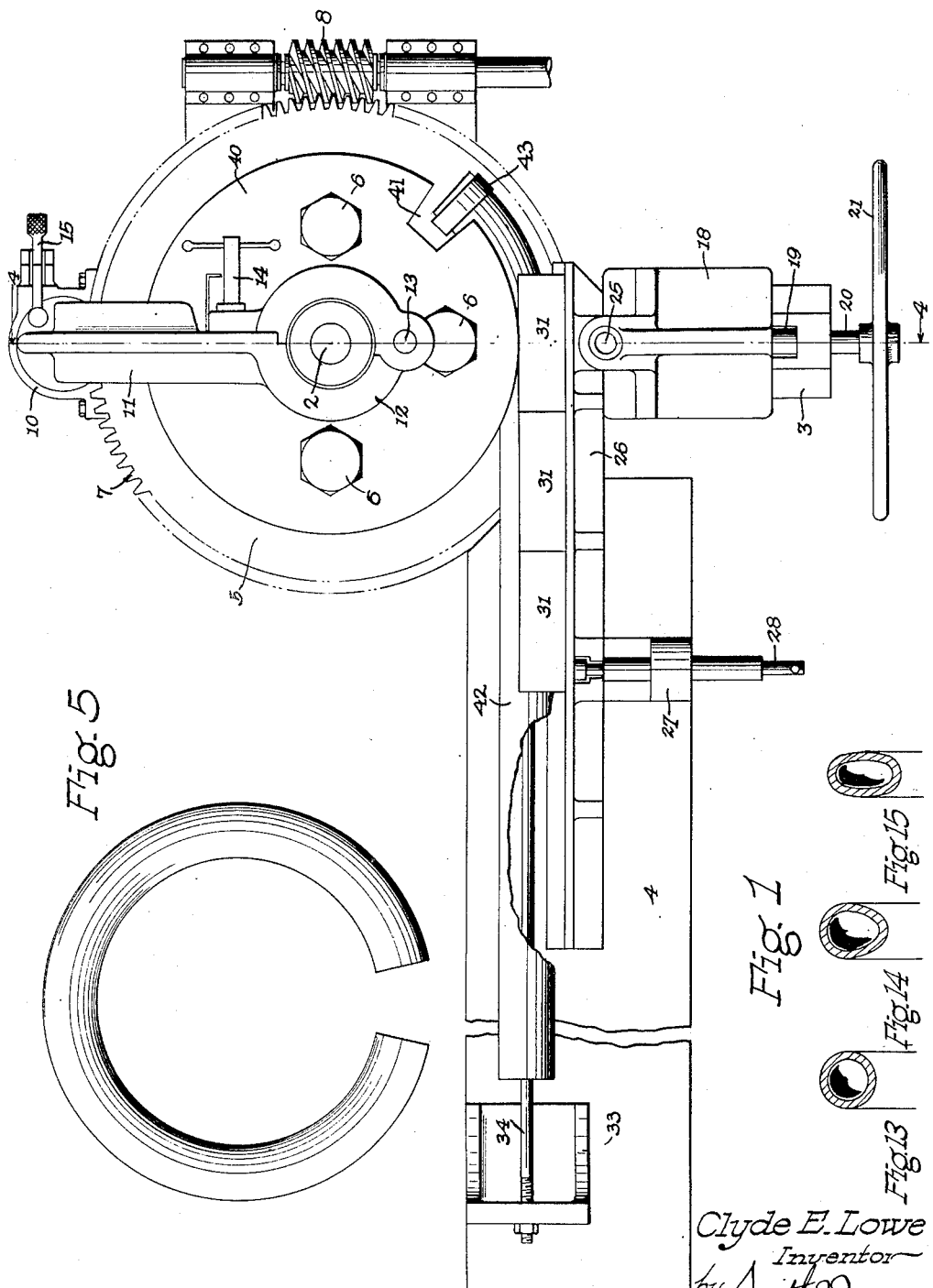
Figure 2:
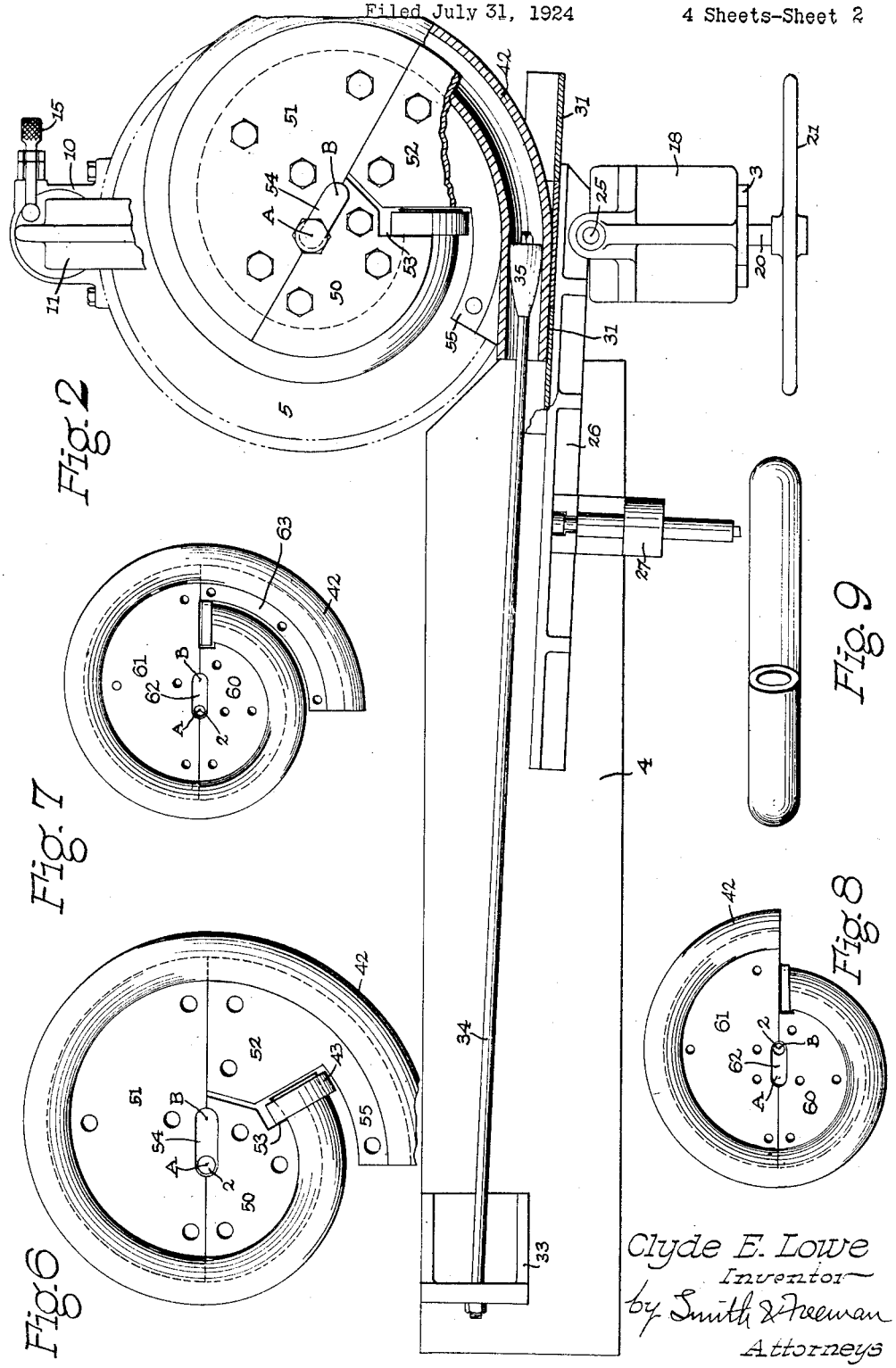
Figure 3:
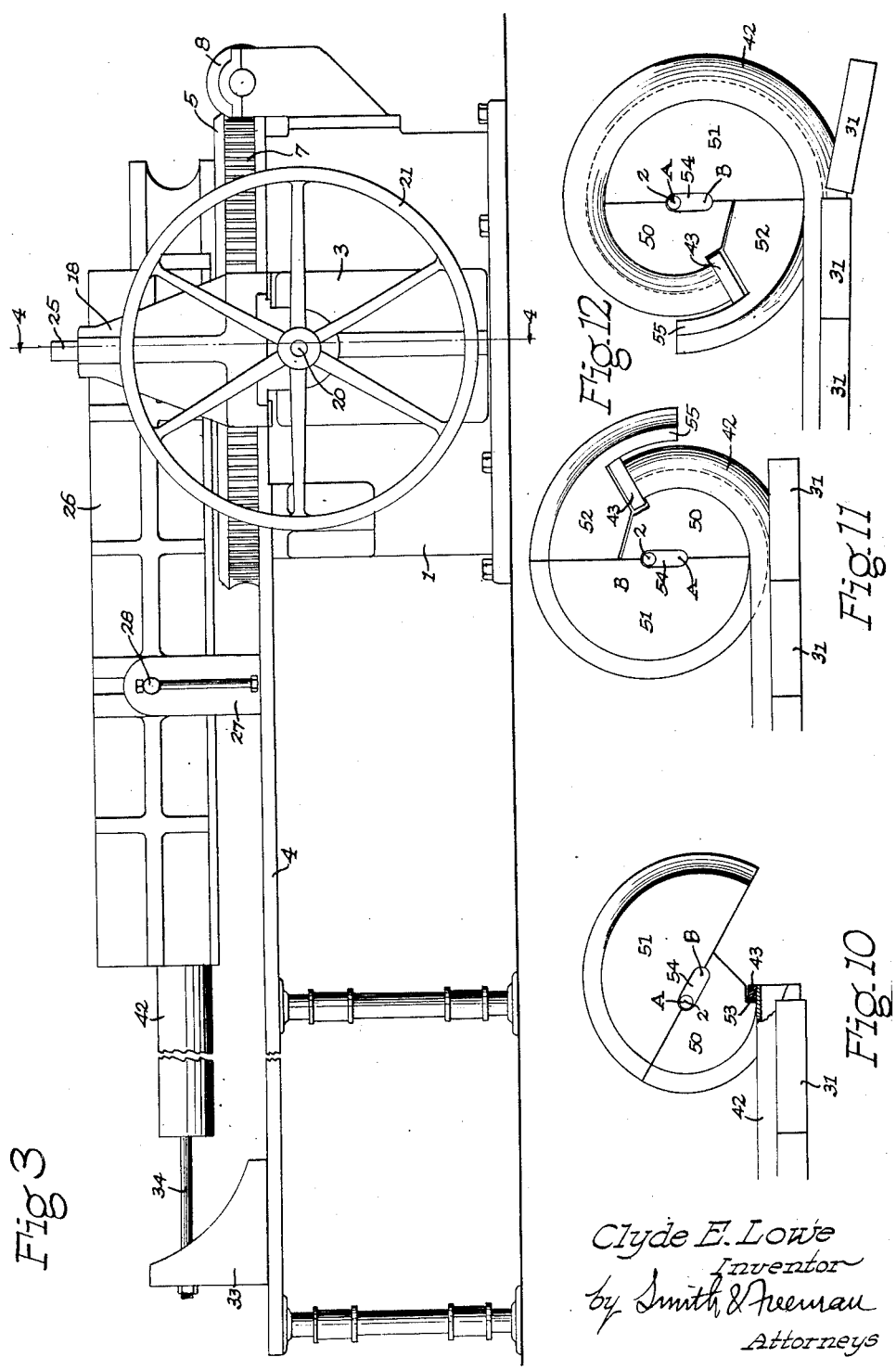
Figure 4:
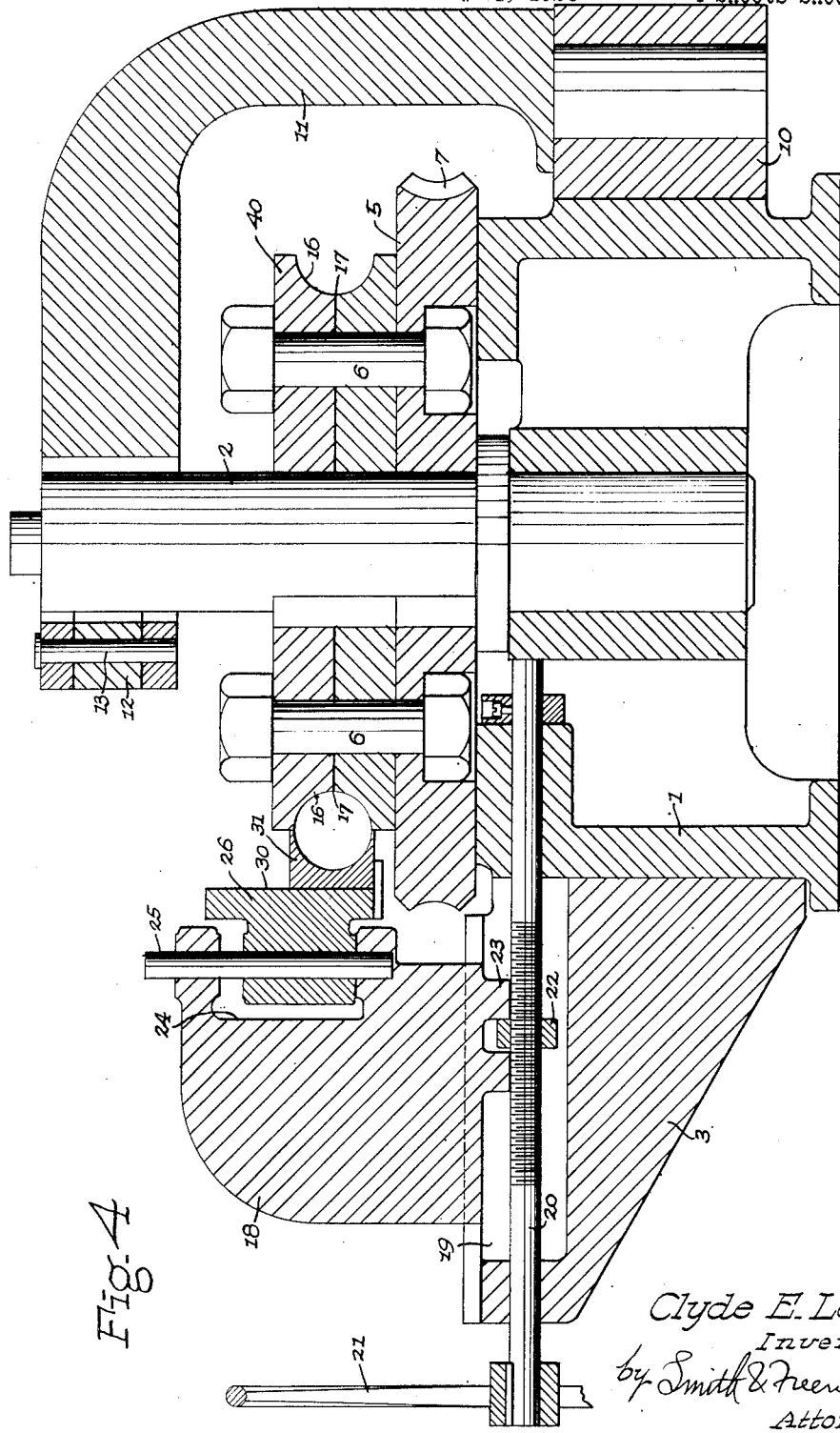

In the drawings accompanying and forming a part of this application, Fig. 1 represents a top plan view of a machine embodying certain of my improvements; Fig. 2 is a similar view of the same machine but with certain parts shown in section and a different form of die in use; Fig. 3 is a rear elevation of the machine; Fig. 4 is a sectional view of the machine corresponding to the line 4—4 of Figs. 1 and 3; Fig. 5 illustrates one type of mandrel capable of being made on a machine by use of the die shown in Fig. 1; Fig. 6 is a top plan view of a modified form of mandrel embodying my improvements together with the die members employed in forming the same; Figs. 7 and 8 are similar views of modified forms of mandrel with their die members; Fig. 9 is an edge view of any one of said mandrels; Figs. 10, 11, and 12 illustrate successive steps in the formation of my improved mandrel employing the machines and dies of my invention; and Figs. 13, 14, and 15 illustrate cross sectional shapes of different mandrels which may be made by my improved mechanism.

The mandrel made on my improved machine preferably has the form of a flat spiral, preferably, but not necessarily, having its ends overlapped in order to obtain a greater length and diameter of tube within a given area; and while, so far as the mandrel itself is concerned I do not limit myself to this construction, I preferably make the same of one piece seamless metal tube, any suitable or desired material can be used such as steel, aluminum, duralumin or many other alloys.

The machine which I have chosen for purposes of this disclosure comprises a massive frame 1 having journaled therein a vertical shaft 2 and also having at one side a bracket 3 and an elongated horizontal shelf or table 4. Rigidly keyed to the shaft 2 is a massive circular rotating table 5 carrying suitable bolts 6—6 for the attachment of dies hereafter described. Suitable means are provided for rotating this table and shaft slowly and under great power, the means here illustrated comprising a worm gear 7 meshing with a worm 8 driven by any suitable source of power. In the present embodiment the worm gear is formed integral with the table 5 upon the periphery thereof, but it will be understood that any suitable relation or connection of this gear to the shaft is sufficient. I have also shown one side of this frame as provided with a box 10 in which is journaled the angular arm 11 adapted to overhang the table and having at its free end the bearing member 12 made in two parts hinged together upon the pin 13 and adapted to be fastened together by the handle 14, the bearing 12 engaging the upper end of the shaft 2 so as to steady the same. A suitable latch 15 may be employed for holding this arm in the desired position. Such arm is required only in handling the heaviest grades of work and I do not limit myself to its use.

The dies consist of massive metal plates bolted to the top of the table 5 and formed with a peripheral groove 16 of a shape and size to receive the inner periphery of the mandrel. Each part of the groove 16 during operation is concentric with the shaft 2, and the die members are split upon the line 17 intersecting the bottom of this groove.

Slidably mounted on top of the bracket 3 is a traveling head 18, the engaging faces of the head and bracket being suitably tongued and grooved for guiding purposes. The upper face of the bracket is formed with an upwardly opening recess 19 traversed by an adjusting screw 20 which is arranged parallel to the plane of the table 5 and radial to the shaft 2. Outside of the bracket this shaft is provided with the adjusting wheel 21, and inside the same with a nut 22 which is engaged by suitable portions 23 of the head 18 which depend into the recess 19 for that purpose. Opposite the edges of the dies the face of the head 18 is formed with a recess 24 traversed by a vertical pin 25 on which is pivoted a guiding beam 26. This beam preferably projects a considerable distance over the shelf 4 the latter being provided with an upright bracket 27 equipped with an adjusting screw 28 whereby said beam can be swung inwardly or outwardly so as to maintain it tangent to the dies at the point of contact. The forward face of this beam is flat and smooth as shown at 30 for the reception of chanenl dies 31 which consist merely of metal blocks having grooves formed in their forward faces adapted to register with the grooves 16 of the first dies and define therewith the cross sectional area of the mandrel desired, whether the same be round, oval, or otherwise.

Located upon the shelf 4 at a distance from the head 18 is a bracket 33 to which is attached a tension rod 34 which projects parallel with the shelf to a point opposite the head 18 where it is provided with a metal head 35, sometimes called a triplet, which serves to support the walls of the tube during the bending operation and prevent them from collapsing, wrinkling or becoming distorted. This head or triplet conforms closely in size and shape to the interior of the tube desired.

The curved die members shown at 40 in Fig. 1 are of plain circular form, the top member and bottom member being each in one piece and Fig. 5 represents a mandrel of the type produced thereby. Each of these dies is formed at one place in its periphery with an abrupt shouldered notch 41 for the attachment of the end of the tube which is to be bent thereon. This tube is shown at 42 and is preferably, though not necessarily, formed of the cross section desired for the finished mandrel, round, oval, ovate, or oblong as the case may be. Its forward end is surrounded by a rigid collar 43 and the tube clamped thereto either by a spreader or by hammering the end of the tube outwardly or by canting the collar so as to grip the metal. The head 18 is adjusted so as to press the channel dies tightly against the metal. These channel dies are preferably made in short sections so as to be removed from the front and replaced at the rear at the point of bending as the operation proceeds.

The curved dies shown in Figs. 2, 6, 7, and 8, instead of being circular and concentric with the shaft 2, are made segmental surrounding an elongated central slot, the different portions of the die being concentric with different portions of the slot so that each part of the die can in turn be shifted into the proper relation relative to the shaft, and used to bend the tube into approximately the shape of a spiral of Archimedes.

Referring first to the form illustrated in Figs. 2, 6, 10, 11, and 12, I have shown a die made of three sections, 50, 51, and 52. The section 50 is concentric about a point A and in the preferred form subtends an arc of 120°, its inital end defining an abrupt shoulder 53 for the reception of the collar 43. During the time that this portion of the die is being moved past the triplet, the die is so located that the point A coincides with the shaft 2.

The segment 51 subtends approximately 180° about a larger radius whose center is B, the centers A and B being connected by an elongated slot 54. As soon as the drawing has substantially reached the end of the segment 50, the dies are shifted across the table so as to cause the shaft 2 to coincide with the point B as shown in Fig. 11, this being permitted by the slot 54. This adjustment also requires the withdrawing of the beam 26 to a greater distance which is effected by the screw 20. The drawing operation can now be continued about this center for a further space of 180°.

Some time during this period the third segment 52 is applied, said segment being swung about the point A as a center and further characterized, in the preferred species, by the possession of a curved extension 55 overlying the surface of the segment 50 but spaced therefrom a sufficient distance for the free reception of the inner end of the mandrel. When the segment 51 has been traversed, the dies are again shifted to cause the shaft 2 to coincide with the point A, the beam 26 is likewise adjusted, and the tube drawn to the end of the section 55 or such point thereon as choice may dictate. Preferably these die segments are fastened to a plate additional to and lying above the table 5 whereby the three members may be shifted as a whole, but this is not essential. It will be understood that the drawing operation can be terminated prior to any overlapping, thereby producing a mandrel of the type shown in Fig. 8.

Another mode of making the dies is shown in Figs. 7 and 8 wherein the dies are composed principally of a pair of semi-circular members 60 and 61, of unequal radius, placed with their flat faces abutting and one curved edge continuous. The smaller segment 60 is concentric with the center A and the larger segment is concentric with the center B, a slot 62 being formed whereby the die may be shifted to bring either of these centers into coincidence with the shaft 2. In case the mandrel is to be continued throughout more than 360° an additional section 63 is employed, concentric with the center A. In each case this last segment is necessary to be omitted during the drawing of the first portion of the mandrel, and applied at some time during the course of the drawing operation.

I do not restrict myself to any one shape of mandrel. The simplest and most common is that shown in cross section in Fig. 13, a plain circular tube being employed. This, however, may be modified into either the ovate shape illustrated in Fig. 14 and more fully set forth in my application filed August 21, 1922, Serial No. 583,341, or a uniform oblong section as shown in Fig. 15, the dies and triplets suitably shaped for the purpose, and the tubing being initially flattened if desired to conform thereto.

It will be understood that I do not limit myself to the employment of any steadying arm, or of the formation of the worm teeth on the rotating table itself, or to any of the details of the different dies, nor in any other respect except as specifically recited in my several claims which I desire may be construed each for itself without respect to limitations contained in other claims.

Having thus described my invention what I claim is:

1. A die for drawing tire mandrels comprising a segmental metal block formed with a peripheral groove, the block being split upon a plane which intersects said groove and the different segments constituting arcs about different centers, said block having an elongated slot which contains said centers.

2. A die for drawing tire mandrels comprising a metal block shaped substantially like a spiral of Archimedes and having a groove on its spiral surface, the portion of said die which has the greatest radius being bodily removable and said die being split along a plane which intersects said groove.

3. A die for drawing tire mandrels comprising a semi-circular metal block and a second block having a curved surface of different radius merging with the surface of the first block, the peripheral surface of said blocks being grooved and the blocks being split upon a plane which intersects said groove.

4. A die for drawing tire mandrels comprising a semi-circular metal block and another block secured at each end of the diameter thereof, said last blocks having their margins struck upon radii which are greater and less, respectively, than the radius of the first block, the centers of curvature of said last mentioned blocks substantially coinciding.

5. In a machine for drawing tube mandrels, the combination with a rotatable table of dies adapted to be secured thereto and having different portions curved about different centers, and means for securing said dies in different positions relative to said table to cause said centers to coincide successively with the axis of rotation thereof.

6. In a machine for drawing tube mandrels, the combination with a rotatable table of dies adapted to be secured thereto and having different portions curved about different centers, a guiding beam mounted at one side of said dies, means for securing said dies in different positions relative to said table to cause said centers to coincide successively with the axis of rotation thereof, and means for adjusting the distance between said guiding beam and center to bring it into cooperative relation with the different parts of said dies.

7. In a machine for drawing tube mandrels, the combination with a rotatable table of a die secured thereto and having a peripheral groove curved about the axis of revolution of said table, a guiding beam at one side of said table and lying in the plane of such curve, a channel die movable along said beam and having in its face a groove which joins with the first groove to define the exterior outline of the cross section of the resulting mandrel, a triplet mounted in the space defined by said grooves and defining the interior outline of the mandrel's cross section, means to fasten one end of a tube to the first named die, and means for holding said triplet against longitudinal movement.

8. In a machine for drawing tube mandrels, the combination with a rotatable table, of a die secured thereto and having a peripheral groove curved about the axis of revolution of said table, said die having at one point an abrupt walled notch, a loose collar adapted to fit into said notch, means for fastening said collar securely to a tube, a second die member tangent to said first die member at the point of bending and having a groove which cooperates with the first groove in defining the exterior cross section of the finished mandrel, and means for preventing collapsing of the tube.

9. In mechanism of the character described, in combination, a frame having an upright bearing, a vertical shaft therein, a horizontal rotatable table carried by said shaft, split dies having a curvilinear grooved periphery subtending substantially a full circle secured to said table, means including a worm and worm gear for rotating said table, a companion die member tangent to said first die member, means for holding said companion die member at a fixed distance from said first die member while permitting it to move circumferentially therewith, means for securing one end of a tube to the periphery of said first die member and means for avoiding interference between said securing means and said companion die member at the conclusion of a revolution.

10. In mechanism of the character described, in combination, a split die having a curvilinear non-circular grooved surface mounted for rotation about an axis which is concentric with such surface, the edge of said die being intersected by a radial notch, a companion die member tangent to said first die member, means for holding said companion die member at a fixed distance from the center of said first die member while permitting it to move circumferentially with said first die member, and a collar adapted to embrace closely the end of the tube to be bent and to fit in said notch.

11. In mechanism of the character described, in combination, a frame having an upright bearing, a vertical shaft in said bearing, a horizontal rotatable table carried by said shaft, a guiding member moved horizontally across said table, a curvilinear grooved die carried by said table and subtending substantially a complete circle, a second grooved die carried by said member tangent thereto, means for rotating said table, and means enabling the rotation of said table a full revolution without interference with said guiding member.

In testimony whereof, I hereunto affix my signature.

CLYDE E. LOWE.